Aug. 23, 1960  C. J. LAPETINA ET AL  2,949,699
FLOWER POT AND MATERIAL FOR MAKING THE SAME
Filed Dec. 17, 1956  2 Sheets-Sheet 1
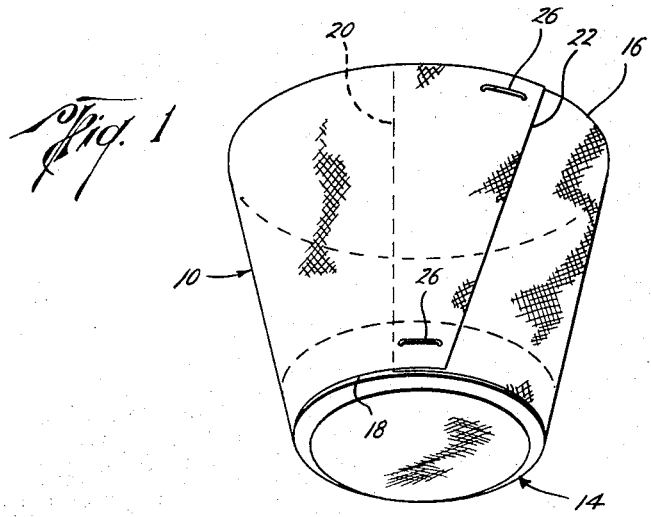
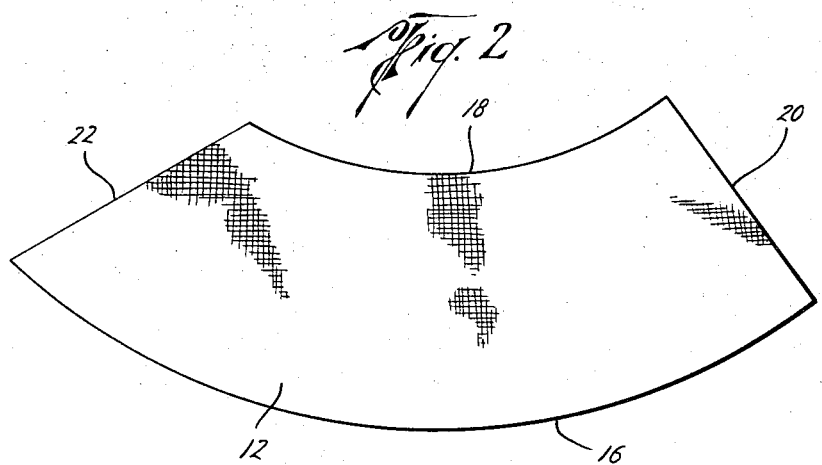
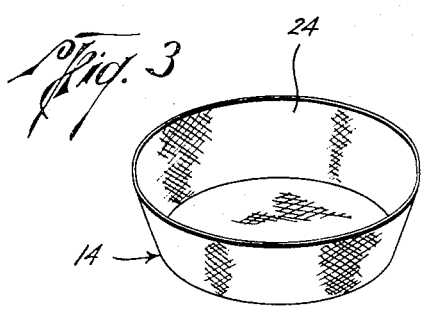
Charles J. Lapetina
Victor H. Salinas
INVENTORS
BY
Charles E. Lightfoot
ATTORNEY Aug. 23, 1960   C. J. LAPETINA ET AL   2,949,699
FLOWER POT AND MATERIAL FOR MAKING THE SAME
Filed Dec. 17, 1956   2 Sheets-Sheet 2
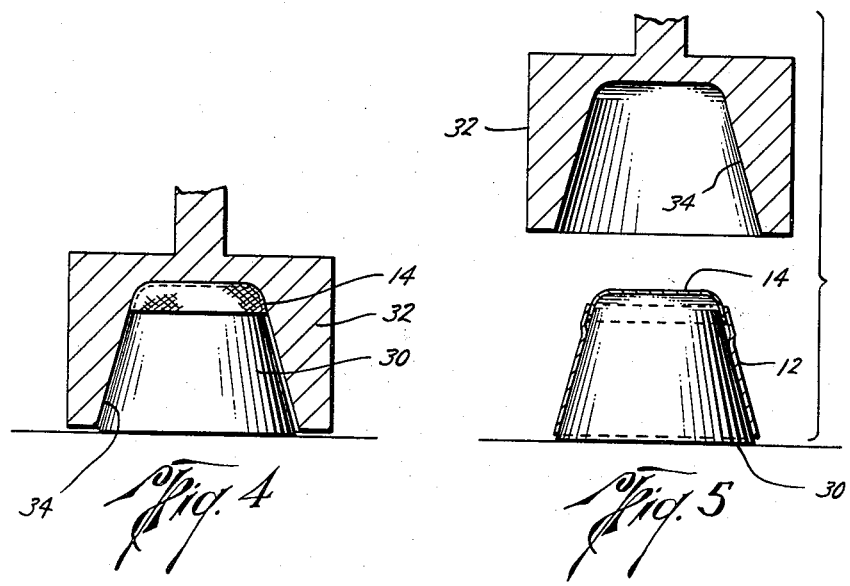
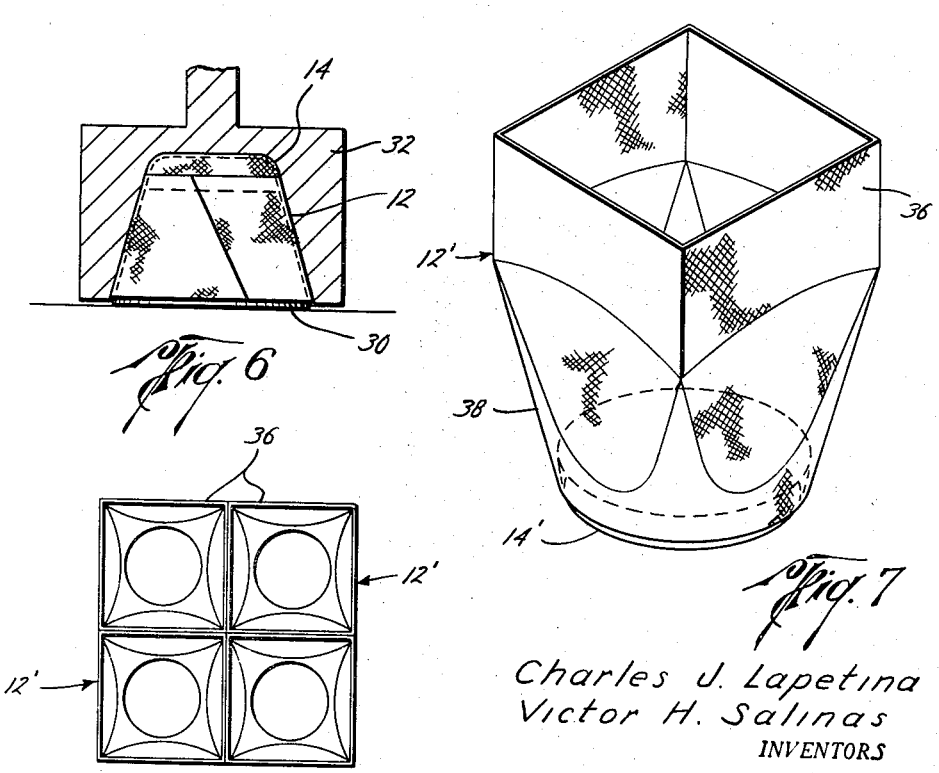
Charles J. Lapetina
Victor H. Salinas
INVENTORS
BY
Charles E. Lightfoot
ATTORNEY

United States Patent Office 2,949,699
Patented Aug. 23, 1960

2,949,699

FLOWER POT AND MATERIAL FOR MAKING THE SAME

Charles Joeseph Lapetina, 310 W. 18th St., and Victor Hugo Salinas, 407 W. 9th St., both of Houston, Tex.

Filed Dec. 17, 1956, Ser. No. 628,763

2 Claims. (Cl. 47—37)

This invention relates to a flower pot and material for making the same, for propagating plants.

In the propagation of plants as commonly practiced by nurserymen and growers, seeds and seedlings are planted in small pots, usually of clay, in which they are allowed to grow until they reach the proper size for marketing. When the plants propagated in this manner are ready to be sold it is customary to re-pot them in pots made of paper, the plants being removed from the clay pots by a process known as "rapping" in which each clay pot is inverted and the rims of the pot rapped or struck against a support, such as a greenhouse bench, to loosen the earth in the pots, after which the earth with the plant is transferred to a paper pot. The re-potting of plants in this manner requires the separate handling of each plant, which results in greatly increased expense, and also in substantial loss due to breakage of the clay pots and failure of the re-potted plants to grow due to the shock of re-potting and from other causes.

Plants propagated in this manner are sometimes sold without re-potting, which also greatly increases the cost.

Another disadvantage encountered in the propagation of plants in clay pots is that the plants often become waterlogged when grown under greenhouse conditions, due to over watering and the lack of sufficient aeration to promote rapid evaporation of moisture, resulting in a substantial loss of plants and necessitating close control of watering during the propagation period.

Heretofore, various means have been proposed for overcoming the above difficulties, such as the propagation of plants in flats from which they are removed and potted when properly grown, or the use of paper pots to avoid the necessity of re-potting. In the use of flats, however, the plants must still be separately potted when they are to be sold individually, and the use of paper pots is unsatisfactory due to their lack of strength, deterioration when wet, and waterlogging of the plants, as in the use of clay pots. Paper pots which have been treated to withstand wetting also make it necessary that the plant be removed for setting out, since such pots do not disintegrate quickly when planted in the soil.

The removal of the plants from the pots in transplanting the same also often results in disturbing the roots which sometimes causes shock and retardation of growth.

The present invention has for an important object the provision of a flower pot by which the above disadvantages may be overcome, from which it is unnecessary to remove the plant in transplanting the same, and which does not interfere with the root growth of the plant when transplanted.

Another object of the invention is to provide a flower pot which is constructed to permit aeration of the soil therein and to prevent waterlogging, through which the plant's roots may readily grow, which resists deterioration for long periods of time under ordinary conditions of use, but which rapidly deteriorates when planted in the soil.

A further object of the invention is the provision of a flower pot formed of an improved material for that purpose which is durable and resistant to decay while exposed to the air under ordinary conditions of use, but which rapidly disintegrates when placed in the earth.

Another object of the invention is to provide an improved method for the propagation of plants by the use of which improved root development is secured and shock and growth retardation due to transplanting is reduced.

The above and other important objects and advantages of the invention may best be understood from the following detailed description, constituting a specification of the same, when considered in conjunction with the annexed drawings, wherein—

Figure 1 is a perspective view of a preferred embodiment of the invention;

Figure 2 is a side view of a body element of the embodiment of the invention illustrated in Figure 1 prior to assembling the parts;

Figure 3 is a perspective view of a bottom element of the invention as illustrated in Figure 1 prior to assembling the parts;

Figure 4 is a side elevational view, partly in cross-section, and on a somewhat reduced scale, showing one form of molding apparatus by which the pot of the invention is formed and illustrating one stage of a method by which the pot may be formed and assembled;

Figure 5 is a view similar to that of Figure 4 illustrating a further stage in the method of forming and assembling the pot;

Figure 6 is a view similar to that of Figure 4 illustrating a still further stage of the method of forming and assembling the pot;

Figure 7 is a perspective view illustrating a somewhat modified form of the invention; and Figure 8 is a top plan view, on a reduced scale illustrating the manner in which the pots of the form of the invention shown in Figure 7 may be placed together in a space saving arrangement.

Referring now to the drawings in greater detail, the flower pot of the invention may be of substantially conventional shape, such as that shown at 10 in Figure 1, the same being of circular shape in horizontal cross-section and being tapered from top to bottom. The pot is preferably formed of stiffened fabric of a type having a relatively coarse, open mesh, such as burlap and may conveniently consist of a body or side wall part 12 and a bottom part 14, shaped to be assembled in the manner illustrated in Figure 1. The body or side wall part 12 is conveniently shaped, as shown, having arcuate upper and lower edges 16 and 18, respectively, an end edge 20 extending substantially at right angles to the upper and lower edges 16 and 18 and an end edge 22 extending at an acute angle to the upper edge 16 and at an obtuse angle to the lower edge 18, as best seen in Figure 2. The body part 12 is so shaped that it may be rolled up or wrapped about a mandrel, with its end portions in overlapping arrangement, to form a cone shaped structure having an open top and bottom.

The bottom part 14 may be formed as a flat circular disk, which is then shaped into a cup shape by suitable dies or the like, to provide an annular rim 24 of a size to fit snugly inside of the bottom portion of the body part 12 when rolled, with the external surface of the rim 24 in engagement with the interior surface of the body part.

The overlapping end portions of the body part may be secured together in any convenient manner, as by the use of staples, or the like, the bottom part 14 being similarly secured to the body part. The body part may be secured in rolled condition and the bottom part held in place by other means, such as cementing or otherwise.

For the purpose of stiffening the fabric as well as rendering the same resistant to decay and disintegration the fabric is treated with a suitable indurating composition of which the following is an example:

|  | Percent |
|---|---|
| Pigment | 15 |
| Varnish | 30 |
| Solvent | 55 |

The pigment of the composition may, for example, be burnt umber or other pigment of the oxide type, such as oxides of iron, which serves not only as a coloring material, but also possesses the quality of resistance to decay and deterioration due to long exposure in the air to moisture, but which has little or no deterrent effect on the decay of the fabric when the same is buried in the soil and substantially shut off from continuous aeration and exposed to the combined action of chemical constituents of the soil and soil moisture.

The varnish of the above mentioned composition may be a common type, such as a mixture of linseed oil or tung oil and a suitable gum, such varnish acting as a vehicle for the pigment and as a further aid to the stiffening and indurating of the fabric, while the solvent may be any of a number of relatively volatile liquids, such as naphtha. The solvent is used to render the composition flowable and to cause the same to dry quickly when applied to the fabric.

It will be understood that the proportions of the ingredients given in the above example are approximate only, and that the amounts of the ingredients employed in the composition may be substantially varied or other ingredients of similar character substituted, while retaining the full benefit of the advantages of the invention.

The above composition may be applied to the fabric in any desired manner as by spraying, dipping, or otherwise to thoroughly saturate the fabric and to leave the mesh of the same in an open condition when dried, whereby thorough aeration of the fabric as well as the soil in the pot may take place. The fabric so treated is when dry sufficiently stiffened to be easily rolled for forming the body part yet easily molded to shape the bottom part. The treated fabric becomes more pliable when subjected to heating, for example to approximately the boiling point of water, whereupon it may be easily molded to shape the bottom part of the pot which then retains its shape when formed.

In making use of the pots made in accordance with the invention, seeds, seedlings or other plants are planted in the soil in the pots in the usual manner. By the use of open mesh pots treated and constructed as described, more water may be applied to the soil in the pots without danger of waterlogging, the excess moisture passing out through the mesh and being rapidly evaporated. Due to the open character of the fabric air may pass freely through the pot so that the fabric is prevented from decaying as long as the pot remains exposed to the air, such as under ordinary greenhouse conditions. In the propagation of plants in this manner the soil in the pot is continuously aerated, which results in rapid and vigorous root development, the roots often growing out through the openings of the mesh to form a greatly enlarged root system.

When it is desired to set out plants thus propagated the pot with the plant therein is planted in the ground without in any way disturbing the root system. By this means the shock due to the injury or disturbance of the root system upon removal of the plant from the pot is entirely avoided, resulting in substantially no retardation in growth upon transplanting. When the pot has been planted in the ground, the fabric of the pot is substantially shut off from the air, the mesh of the fabric being closed by the soil so that the fabric rapidly decays and crumbles. The time required for complete disintegration of the fabric after planting of the pot varies somewhat, depending upon the character and condition of the soil and the amount of moisture present, substantially complete disintegration usually taking place within about one month.

The method of propagating plants in accordance with the invention thus comprises the planting of seeds, seedlings or the like, in suitable soil in open mesh fabric containers or pots, which are maintained exposed to the air to permit the free passage of air whereby the soil is continuously aerated, watering the soil in the pots and permitting the plants to grow until the roots extend through the openings in the mesh and until the plants are of a suitable size for transplanting, after which the pots with the plants therein are transferred to the ground.

A preferred method and apparatus by which the pots of the invention are formed and assembled is illustrated in Figures 4, 5 and 6 wherein a mandrel or die 30 is shown, which is suitably shaped and over which the body part 12 and bottom part 14 may be placed. A mold 32 is also provided having a cavity 34 which is shaped to receive the mandrel 30 and to press the fabric parts into shape thereon when placed over the die with the fabric on the die. The molding apparatus may be suitably heated, if desired, to soften the composition with which the fabric has been treated to render the same more easily shaped.

In forming and assembling the pots, the bottom part 14 may first be placed on the die 30 and the mold pressed into contact therewith, as shown in Figure 4, to form the bottom part into a cup shape. The mold may then be withdrawn and the body part 12 wrapped about the die with the lower margin of the body overlapping the rim portion of the bottom part, as seen in Figure 5, whereupon the mold may again be pressed over the die to shape and secure the parts together, as shown in Figure 6. The parts may be secured together by the coating composition by the application of heat thereto during the molding, or by some other means, such as the use of a suitable cementing composition.

The pots thus formed and assembled are strong and durable, capable of withstanding rough handling and even crushing without impairment of their utility, and may be nested for purposes of packaging and shipping.

A somewhat modified form of the pot of the invention is illustrated in Figures 7 and 8, wherein the upper portion 36 of the body 12' of the pot is of rectangular shape, while the lower portion 38 of the same may be of substantially circular cross-sectional shape and tapered toward the bottom. By so shaping the pots, they may be placed in a compact arrangement, such as that illustrated in Figure 8, whereby bench space may be utilized to its full advantage, while at the same time the benefit of continuous aeration of the fabric and soil is maintained.

If desired the pots may be formed by molding the same in one piece of fabric by pressing the same in molding apparatus of suitable size and shape.

It will thus be seen that the invention provides a flower pot which is of unbreakable character, capable of long withstanding disintegration when exposed to ordinary greenhouse conditions, but which decays rapidly when planted in the soil. The invention also includes an improved method for the propagation of plants wherein the soil and plant are maintained in a condition of maximum aeration until ready for transplanting, whereby maximum root development is obtained and shock due to disturbance of the root system in transplanting is avoided.

It will be understood that the invention is capable of various modifications within the spirit of the invention and the scope of the appended claims.

Having thus clearly shown and described the invention, what is claimed as new and desired to secure by Letters Patent is—

1. A tapered flower pot formed entirely of open-mesh sheet-like material comprising a side wall having upper and lower substantially circular edges and end portions secured together in overlapping relation, one end edge of said side wall extending substantially at right angles to said upper and lower edges and the other end edge of said side wall extending at an angle to said one end edge, said end portions overlapping to a greater extent at the upper edge of the side wall than at the lower edge thereof, and a bottom having a circular disc-like bottom wall and an upstanding conical rim positioned inside of and secured to said side wall with the external surface of the rim in contact with the internal surface of the side wall.

2. A tapered flower pot formed entirely of open-mesh sheet-like material comprising a side wall having upper and lower substantially circular edges and overlapping end portions secured together, said end portions overlapping to a greater circumferential extent at the upper edge of the side wall than at the lower edge thereof and a bottom having a circular, disc-like bottom wall and an upstanding conical rim within and secured to the lower marginal portion of said side wall with the external surface of the rim in contact with the internal surface of the side wall.

References Cited in the file of this patent

UNITED STATES PATENTS

| | | |
|---|---|---|
| 193,908 | Alt | Aug. 7, 1877 |
| 994,816 | Cahill | June 13, 1911 |
| 1,435,120 | Holman | Nov. 7, 1922 |
| 1,446,113 | Blackwell | Feb. 20, 1923 |
| 1,464,534 | Lovett | Aug. 14, 1923 |
| 1,994,553 | Wolcott | Mar. 19, 1935 |
| 2,140,932 | Avery | Dec. 20, 1938 |
| 2,202,664 | Leatherman | May 28, 1940 |

FOREIGN PATENTS

| | | |
|---|---|---|
| 6,593 | Great Britain | of 1889 |
| 12,354 | Great Britain | of 1896 |
| 4,464 | Great Britain | of 1909 |
| 366,735 | Great Britain | Feb. 11, 1932 |

OTHER REFERENCES

Publications, Farmers' Bulletin 1591, "Transplanting Trees and Shrubs." Published Aug. 1929 by U. S. Dept. of Agriculture. 34 pages in all; only pages 9, 10, 11 are relied on.

Massachusetts Agricultural Experiment Station Bulletin No. 277, "Flower Pot Composition." Published Oct. 1931 by Mass. State College, Amherst, Mass. The Bulletin is paged 148 through 161. Only pages 154 and 155 relied on.

Hackh's Chemical Dictionary (Blakiston, Phila., 1944), third ed. Page 588 is relied upon.